United States Patent [19]

Nagaya et al.

[11] Patent Number: 5,084,820

[45] Date of Patent: Jan. 28, 1992

[54] ENTRY TEXT DISPLAY SYSTEM

[75] Inventors: Toshikazu Nagaya, Yamatokoriyama; Shigeru Fujimura, Nara; Futoshi Nakane, Nara; Yasushi Yamamoto, Nara; Yasuhiro Takiguchi, Nara; Shigeaki Harada, Nara, all of Japan

[73] Assignee: Sharp Kabushiki Kaisha, Osaka, Japan

[21] Appl. No.: 403,384

[22] Filed: Sep. 6, 1989

[30] Foreign Application Priority Data

Sep. 6, 1988 [JP] Japan .................. 63-223191

[51] Int. Cl.⁵ ........................... G06F 15/20
[52] U.S. Cl. ...................... 364/419; 395/146
[58] Field of Search .................. 364/419, 200

Primary Examiner—Gail O. Hayes
Attorney, Agent, or Firm—Sandler, Greenblum & Bernstein

[57] ABSTRACT

An entry text display system is disclosed which is used in a document editing device which receives and inserts in an existing document a non-defined text and then converts the same to a defined text which is in a form in conformity with the existing document form. The entry text display system includes an entry character display processor for detecting the received non-defined text, storing the received non-defined text, detecting the position of a cursor, which moves right each time a character is entered, and for scrolling the text characters in a line horizontally towards left in response to the insertion of non-defined text. A CRT is provided for displaying the received non-defined text in a line in which the cursor is positioned such that non-defined text characters are sequentially displayed rightwardly until the cursor moves to the right end of the line, and thereafter, the whole line is shifted leftwardly as the non-defined text characters are inserted from the left side of the cursor, and the characters arriving at the left end of the line disappears from the display means. Thereafter, all non-defined text revives on the CRT.

3 Claims, 4 Drawing Sheets

|あ|い|う|え|お|あ|い|う|え|お|　|あ|い|う|え|お|あ|い|う|え|お|
|a|i|u|e|o|a|i|u|e|o| | | | | | | | | | | |

よ い て ん き で あ る 。  K — え
yo i te n ki de a ru　　　　　 e

（あいうえおあいうえお repeated rows）

ENTRY TEXT DISPLAY SYSTEM

BACKGROUND OF THE INVENTION

1. Field of the Invention

The present invention relates to an entry text display system in text generation and document production devices such as Japanese language word processors or office work stations having printing and editing equipment.

2. Description of the Prior Art

Generally, in a word processor for processing Japanese language, sentences are inputted through the keyboard in kana characters (similar letters in the alphabet). Thereafter, while viewing on the screen, a suitable conversion operation is effected to change some of the kana characters to corresponding kanji characters (chinese characters). When the conversion takes place, the total number of the characters used in a sentence expressed only by kana characters is often reduced after the sentence is converted to mixed kana-kanji text. Also, in Japanese word processors, the word wrapping is not necessary since in the Japanese language, it is customary to put a carriage return any place within a word. Therefore, depending on the selected format, every line within the document has the same number of spaces including characters.

In a Japanese word processor having a text generation and document processing device, kana character data entered from a keyboard is converted to mixed kana-kanji text in a as manner described above. The result of this conversion is displayed on a CRT or other display device for editing, and can be printed out in hard copy form or stored in an external storage device.

As office automation equipment has become widely used, devices offering a wide selection of font styles, character sizes, and sophisticated layout capabilities have also become common. In addition, demand is rising steadily for similar pre-print editing functions with the ability to display and interactively edit and revise the document on screen in a what you see is what you get fashion so that the user can get a feel for what the finished document will look like before it is printed in hard copy form.

However, displaying the document to be printed with its particular fonts, character sizes, and particular format (such as column editing, line spacing, character spacing and other parameters) on a CRT or other display device requires significant time to process the display data, diminishing the responsiveness essential for interactive text and layout editing, and thus making the system harder and less desirable to use. Furthermore, text insertion and editing on a conventional Japanese language word processor is performed by inserting text sequentially before the cursor position by entering the desired code of a kana or kanji character to be inserted from a keyboard. As a result, characters still not converted to kana-kanji text may be inserted over multiple lines, making it difficult to discern the new, non-converted hiragana text from the existing kana-kanji text, complicated thus resulting in operation.

SUMMARY OF THE INVENTION

Therefore, the object of the present invention is to provide an improved entry text display system which has a fast display response, while still enabling complex display processing, thereby providing the user with a feeling of smoother operation and better responsiveness.

The entry text display system according to the present invention is for use in a document editing device which receives and inserts in an existing document a non-defined text and then converts the same to a defined text which is in conformity with the existing document form. The entry text display system according to the present invention comprises a device for detecting the received non-defined text, a device for storing the received non-defined text, and a device for detecting the position of a cursor, which moves to the right each time a character is entered. A device is also provided for scrolling (i.e., shifting) a line of text characters horizontally towards left in response to the insertion of non-defined text, and a display is provided for displaying the received non-defined text in a line in which the cursor is positioned such that non-defined text characters are sequentially displayed rightwardly as the cursor moves to the right end of the line and as detected by said cursor position detecting means. Thereafter, the whole line is shifted leftwardly as the non-defined text characters are inserted from the left side of the cursor, and the characters arriving at the left end of the line disappear from the display. An additional device is provided for reviving all the non-defined text on the display inserted in the existing document.

According to the present invention, when the first character of a non-defined text string is entered from an input device at the cursor position on the display, the non-defined text detector detects the character and causes a non-defined text storage device to sequentially store each character of the non-defined character string in a temporary line buffer. The cursor at the end of the non-defined text string moves to the right each time a single character is entered, and when this cursor comes to the right end of the insertion line, its position there is detected by the cursor position detector. A display scrolling device thus causes characters entered thereafter to the non-defined text string to scroll to the left, and displays this insertion text only in the insertion line. Finally, when the text define command is received, a defined text display device causes the non-defined text stored in the line buffer to be displayed on the screen, across several lines if necessary.

Thus, according to the present invention, since the inserted non-defined text scrolls only across one line at which the text is inserted until the text define command is received, not too much time is required to process display data before the text is converted. Thus, the display response is improved, and the kana characters of the non-defined text do not appear across several lines of existing text until character conversion begins. Thus, operation feels much smoother and more comfortable for the user. Specifically, operability and the ease of text insertion and editing on screen are improved.

BRIEF DESCRIPTION OF THE DRAWINGS

These and other objects and features of the present invention will become apparent from the following description taken in conjunction with the preferred embodiments thereof with reference to the accompanying drawings through which like parts are designated by like reference numerals, and in which:

FIGS. 3a to 3e are diagrammatic views showing sample displays during text entry with the above text entry display system, in which Japanese characters are expressed in alphabet letters.

DETAILED DESCRIPTION OF THE INVENTION

Figure 1:
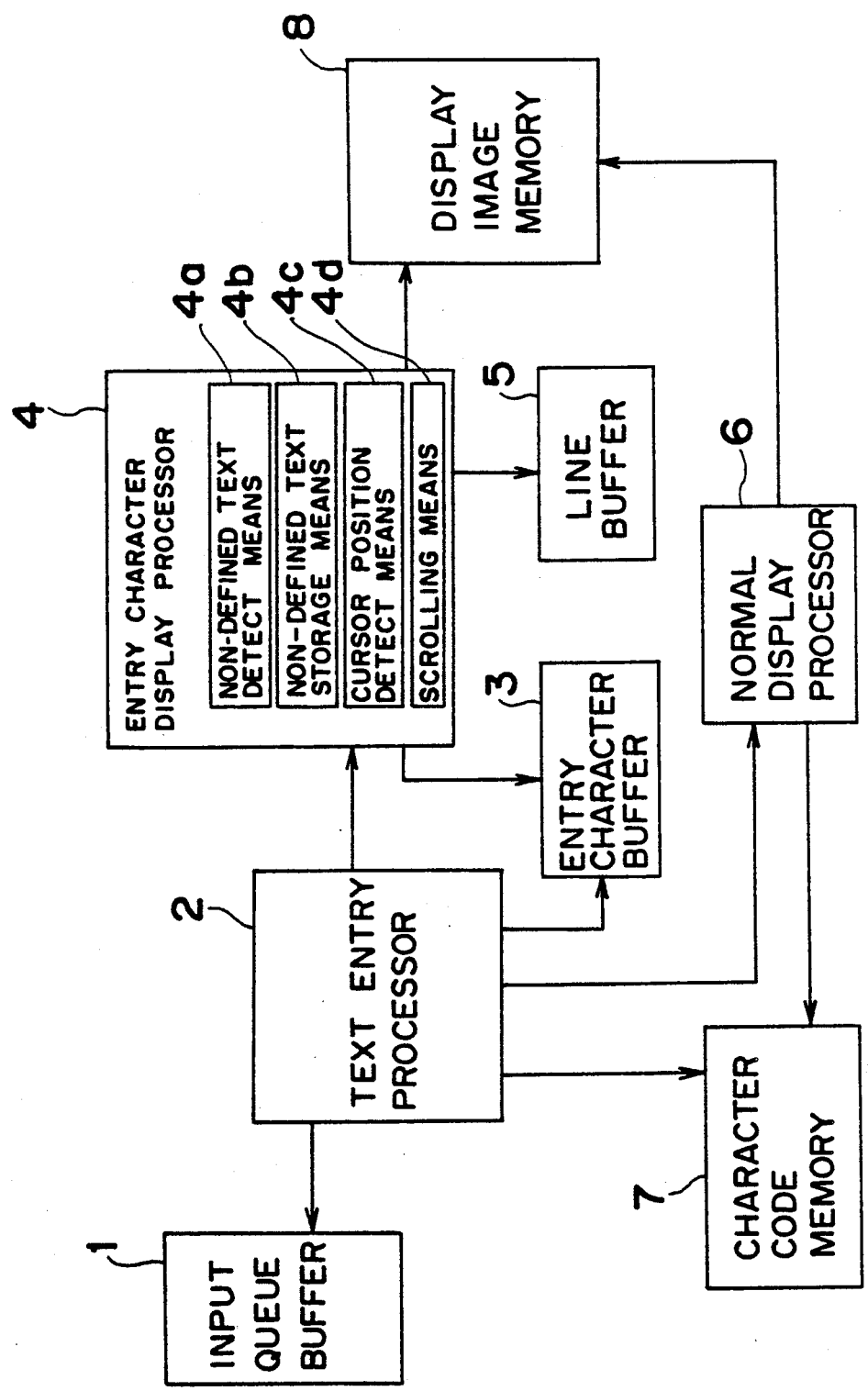
FIG. 1 is a block diagram of a Japanese language word processor using the text entry display system according to the present invention.

Referring to FIG. 1, a block diagram of a Japanese language word processor using the entry text display system according to the present invention is shown. In FIG. 1, reference number 1 is an input queue buffer which sequentially stores the character string entered as kana characters from a keyboard/data entry means, not shown. Text entry processor 2 sequentially reads character data from the head of input queue buffer 1, executes the kana-kanji text conversion and other processing, and stores the read character data to entry character buffer 3. Entry character display processor 4 processes the insertion text for display on the CRT or other display means (not shown in the figure) when the command is received from text entry processor 2. The entry character display processor 4 also includes a non-defined text detector means 4a, non-defined text storage means 4b, cursor position detector means 4c, and scrolling means 4d; these will be described in detail later. Here, the term "non-defined text" is a text which is not arranged in a final form, such as a text expressed only in kana characters. Thus, in this respect, it can be said that the non-defined text is a non-converted text.

A line buffer 5, when the command is received from entry character display processor 4, sequentially stores the non-defined text character by character. A normal display processor 6 converts character data sent from entry character buffer 3 in response to the text define command from text entry processor 2 to codes for the display, with reference to the contents of character code memory 7 thereby defining a defined or converted text for the display. Display image memory 8 stores the character code data output from normal display processor 6 and entry character display processor 4 for output as image data to the pixels of the CRT or other display means.

Figure 2:
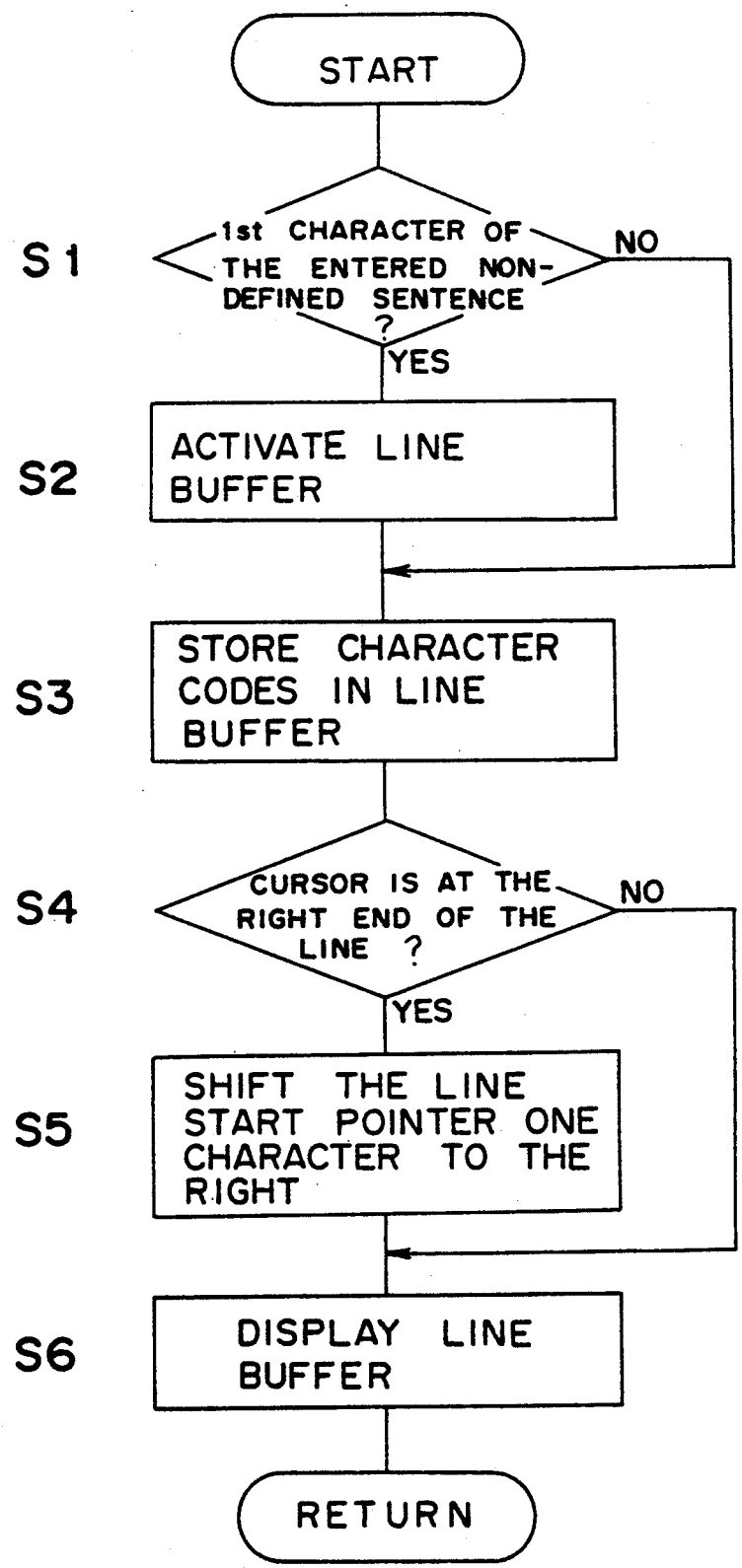
FIG. 2 is a flow chart showing the operation of data processing in the above text entry display system.

The text entry processor 2 determines whether the keyboard action was a character entry, command input, or other action. If the result is character entry, control operation will take place mainly in entry character display processor 4. It is further detected whether or not the key entry is the text define command. If the key entry is the text define command, the text define command described previously is entered. The non-defined text detector 4a of the entry character display processor 4 determines whether the entered character was the first character of the non-defined text inserted at the cursor position on the display (FIG. 2, step S1). If the result is such that the character was the first character in a non-defined text string, the non-defined text storage means 4b sequentially sends and stores each character in the non-defined text string to line buffer 5. Specifically, after writing in line buffer 5 the character codes for all characters from the first to the last character in the line in which the cursor is presently on the screen, the display area and location are determined by the length of the line in which the cursor is resident and the present cursor position, and a line start pointer is set at the leading character in the buffer (FIG. 2, steps S2 and S3).

Then, the cursor position detector means 4c of entry character display processor 4 determines whether or not the cursor, which shifts one character pitch to the right each time a character is inserted, has reached the ultimate right end of the line, to which non-defined text insertion was started (FIG. 2, step S4). If the result is that the cursor is at the right end of the line, the scrolling means 4d is activated to scroll horizontally all characters of the non-defined text entered thereafter sequentially to the left so that only one line is used for displaying the insertion text. When the scrolling takes place, the line start pointer is shifted one character back (to the right), so that the starting point character of the display line is changed. Thus, line buffer 5 is used to display one line length of characters from the character associated with the line start pointer. (FIG. 2, steps S5 and S6). Accordingly, the character which has been shifted to the left end then disappears from the screen in response to the entry of the next character.

The entry operation of text using an entry text display means as thus described will be explained herein below with reference to the flow chart of FIG. 2 and the display examples shown in FIGS. 3a to 3e.

Figures 3A, 3B, 3C:
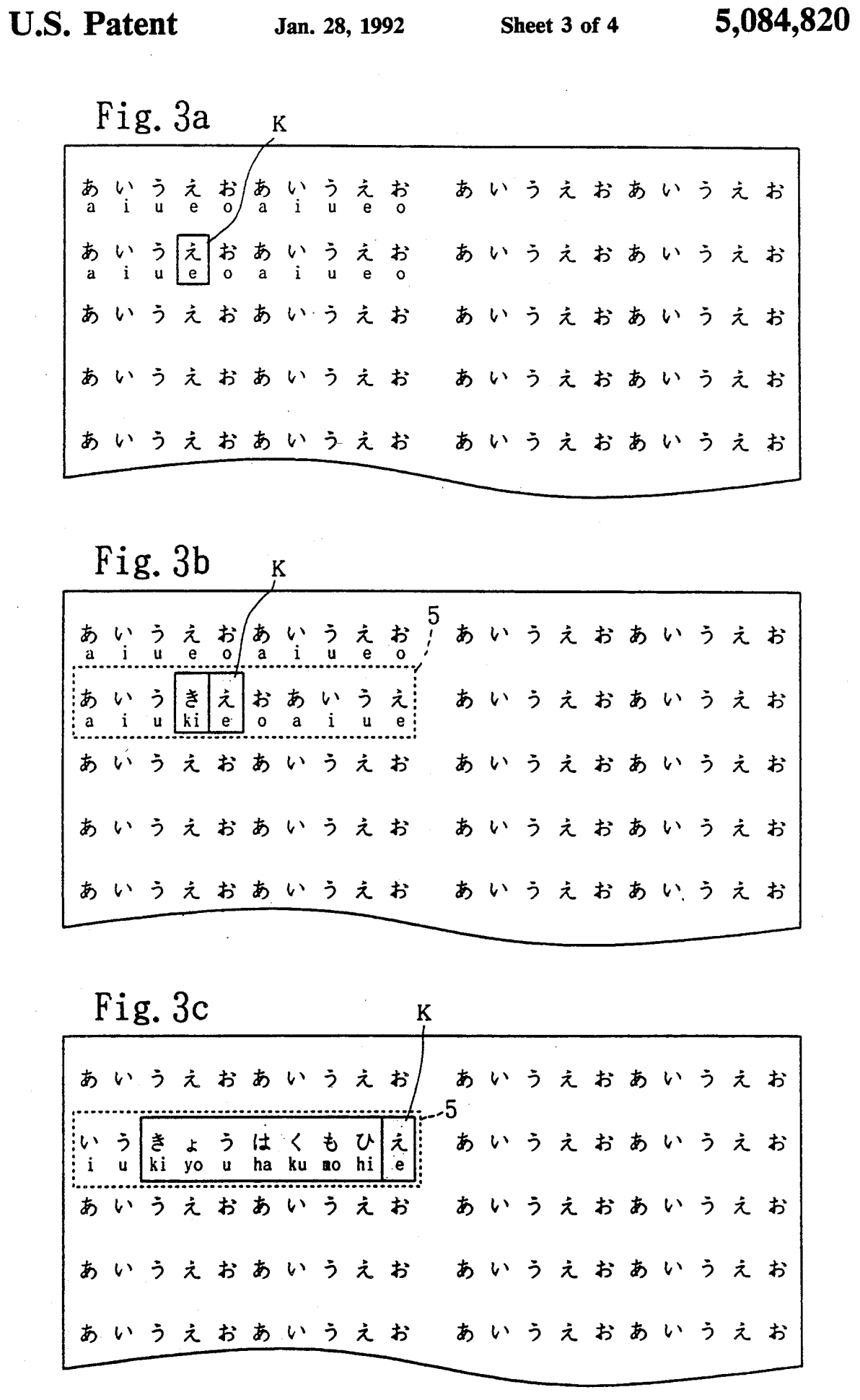

In this example the existing text is indicated by the repetition of Japanese kana characters "a i u e o". Also, it is assumed that the character string entered by the user at cursor K in FIG. 3(a) is "kiyou ha kumo hitotsu nai yoi tenki dearu." (Today is a fine day with no cloud in the sky.) When this string is entered in kana characters, text entry processor 2 determines that the keyboard action was a character entry, and processing is passed to entry character display processor 4. The non-defined text detector 4a of entry character display processor 4 determines that the "ki" which is the leading character of "kiyou" string is the first character in the non-define text string as indicated by step S1. Thus, a line buffer 5 having a size sufficiently large to store characters in the line in which the cursor is located is formed at step S2, as previously described. Then, at step S3 the non-defined text storage means 4b inserts the character code for "ki" at the position in line buffer 5 correspondingly to the cursor position. When character insertion is completed, the cursor position detector (discriminator) 4c at step S4 determines whether or not the cursor K, which moved one character to the right in response to the insertion of "ki" (see FIG. 3b), is at the right end of the line. In this instance, the cursor K is not at the right end of the line, and processing thus proceeds to step S6 where entry character display processor 4 displays the contents of line buffer 5 on the CRT or other display via display image memory 8 as shown in FIG. 3b.

The entry of the following "yo" and successive characters "u ha ku" is a repetition of the processing described above for steps S3, S4, and S6; because the line start pointer is fixed at the position of the leading "a" in the line. Thus, the characters at the right of the cursor K shift sequentially to the right across the screen, each time a new character is inserted. Then, when the next character "mo" is entered, the cursor K reaches the right end of the line. Thus, the detection at step S4 results YES, as effected by the cursor position detector 4c, and the program advances to step S5. Thus, the scrolling means 4d shifts the line start pointer to the "i" which is to the immediate right of the current cursor position. Thus, the single line character string in line buffer 5 displayed at the next step S6 reads "a i u ki/ yo u ha ku mo e" (in which underlined characters are the newly inserted characters). When the next character, "hi" is entered, steps S3, S4, S5, S6 are again repeated so that as shown in FIG. 3c, the character (FIG. 3b) leading the line scrolls out of view and the leading character becomes "i" to which the line start pointer is now associated; the character "hi" appears immediately before the cursor K, and the display appears as though it had scrolled one character to the left. Entry and display of the following characters "to" through the final "ru" is achieved by repeating steps S3, S4, S5, and S6. As the display scrolls sequentially to the left, the leading character "ki" in the insertion text also scrolls off the display. The display as it appears when all characters in the non-defined text insertion string have been entered is shown in FIG. 3d.

Finally, when the text define key is pressed on the keyboard, the text define command from text entry processor 2 causes all non-defined text stored to that point in entry character buffer 3 to be read and output to normal display processor 6 where the string is processed and output to the CRT or other display via display image memory 8 so that all non-defined text characters are revived in the CRT. Thus, the final display of the insertion text when being revived is as shown in FIG. 3e. It is, of course, possible at this point to convert the non-defined text string to mixed kana-kanji text using the conversion key on the keyboard.

Thus, because non-defined text, inserted before the text define command is entered, is sequentially scrolled across only one line of the display, processing for text conversion or sophisticated layouts does not require excessive time to process the display data in order to display unnecessary non-defined text strings, and the display response is therefore improved. Furthermore, because non-defined text strings are not inserted to existing defined text across several lines of the display as is done with existing text entry systems, defined and non-defined text can be clearly distinguished. Thus, operation is therefore smoother and easier for the user during text insertion and editing operations.

Although the present invention has been fully described in connection with the preferred embodiment thereof with reference to the accompanying drawings, it is to be noted that various changes and modifications are apparent to those skilled in the art. Such changes and modifications are to be understood as defined by the appended claims unless they depart therefrom.

What is claimed is:

1. An entry text display system for use in a document editing device which receives and inserts in an existing document a non-defined text and then converts the non-defined text to a defined text which is in conformity with the existing document form, said entry text display system comprising;
   means for detecting the received non-defined text;
   means for storing the received non-defined text;
   means for detecting the position of a cursor, which moves to the right each time a character is entered;
   means for the scrolling the text characters in a line horizontally towards the left in response to the insertion of non-defined text;
   means for displaying the received non-defined text in a line in which the cursor is positioned such that non-defined text characters are sequentially displayed rightwardly until the cursor moves to the right end of the line as detected by said cursor position detecting means, and thereafter, the whole line is shifted leftwardly as the non-defined text characters are inserted from the left side of the cursor, and the characters arriving at the left end of the line disappear from the display means; and
   means for retrieving all the non-defined text to be inserted in the existing document onto said display means.

2. An entry text display system as claimed in claim 1, further comprising means for converting said finally inserted non-defined text to defined text.

3. An entry text display method for use in a document editing device which receives and inserts in an existing document non-defined text and then converts the non-defined text to a defined text which is in conformity with the existing document form, said entry text display method comprising the steps of:
   detecting the received non-defined text;
   storing the received non-defined text;
   detecting the position of a cursor, which moves to the right each time a character is entered;
   scrolling the text characters in a line horizontally towards the left in response to the insertion of non-defined text;
   displaying the received non-defined text in a line in which the cursor is positioned such that non-defined text characters are sequentially displayed rightwardly until the cursor moves to the right end of the line as detected by said cursor position detecting means, and thereafter, the whole line is shifted leftwardly as the non-defined text characters are inserted from the left side of the cursor, and the characters arriving at the left end of the line disappear from the display means; and
   retrieving all the non-defined text to be inserted in the existing document onto said display means.

* * * * *